(12) United States Patent
Jakkula et al.

(10) Patent No.: US 12,373,351 B2
(45) Date of Patent: Jul. 29, 2025

(54) EFFICIENT CACHE EVICTION AND INSERTIONS FOR SUSTAINED STEADY STATE PERFORMANCE

(71) Applicant: Samsung Electronics Co., Ltd., Suwon-si (KR)

(72) Inventors: Vijaya Kumar Jakkula, San Jose, CA (US); Siva Ramineni, Milpitas, CA (US); Venkata Bhanu Prakash Gollapudi, Pleasanton, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/235,801

(22) Filed: Aug. 18, 2023

(65) Prior Publication Data

US 2023/0393986 A1  Dec. 7, 2023

Related U.S. Application Data

(63) Continuation of application No. 17/504,490, filed on Oct. 18, 2021, now Pat. No. 11,762,778, which is a
(Continued)

(51) Int. Cl.
*G06F 12/0806* (2016.01)
*G06F 9/30* (2018.01)
(Continued)

(52) U.S. Cl.
CPC ........ *G06F 12/0891* (2013.01); *G06F 9/3009* (2013.01); *G06F 9/5016* (2013.01);
(Continued)

(58) Field of Classification Search
None
See application file for complete search history.

(56) References Cited

U.S. PATENT DOCUMENTS

| | | | | |
|---|---|---|---|---|
| 5,701,432 | A | * | 12/1997 | Wong .................. G06F 12/0842 711/E12.039 |
| 6,298,411 | B1 | * | 10/2001 | Giacalone ........... G06F 12/1063 711/3 |

(Continued)

OTHER PUBLICATIONS

Pat Morin. Open Data Structures. 2013. AU Press. pp. 63-71 and 140-142.*

(Continued)

*Primary Examiner* — Nathan Sadler
(74) *Attorney, Agent, or Firm* — Renaissance IP Law Group LLP

(57) ABSTRACT

A distributed metadata cache for a distributed object store includes a plurality of cache entries, an active-cache-entry set and an unreferenced-cache-entry set. Each cache entry includes information relating to whether at least one input/output (IO) thread is referencing the cache entry and information relating to whether the cache entry is no longer referenced by at least one IO thread. Each cache entry in the active-cache-entry set includes information that indicates that at least one IO thread is actively referencing the cache entry. Each cache entry in the unreferenced-cache-entry set is eligible for eviction from the distributed metadata cache by including information that indicates that the cache entry is no longer actively referenced by an IO thread.

18 Claims, 5 Drawing Sheets

Related U.S. Application Data continuation of application No. 16/812,257, filed on Mar. 6, 2020, now Pat. No. 11,151,050.

(60) Provisional application No. 62/957,120, filed on Jan. 3, 2020.

(51) Int. Cl.
  *G06F 9/50* (2006.01)
  *G06F 12/0817* (2016.01)
  *G06F 12/0891* (2016.01)
  *G06F 12/127* (2016.01)

(52) U.S. Cl.
  CPC ........ *G06F 9/5022* (2013.01); *G06F 12/0806* (2013.01); *G06F 12/0824* (2013.01); *G06F 12/127* (2013.01); *G06F 2209/5011* (2013.01); *G06F 2209/5022* (2013.01); *G06F 2212/1021* (2013.01); *G06F 2212/7207* (2013.01)

(56) References Cited

U.S. PATENT DOCUMENTS

| | | | |
|---|---|---|---|
| 7,424,577 B2 | 9/2008 | Bali et al. | |
| 9,021,207 B2 | 4/2015 | Kalamatianos et al. | |
| 9,460,025 B1* | 10/2016 | Wallace | G06F 12/123 |
| 9,612,967 B1 | 4/2017 | Peterson et al. | |
| 10,754,784 B1 | 8/2020 | Jakkula et al. | |
| 11,151,050 B2* | 10/2021 | Jakkula | G06F 12/0804 |
| 11,762,778 B2* | 9/2023 | Jakkula | G06F 12/127 |
| | | | 711/154 |
| 2004/0215882 A1* | 10/2004 | Alexander | G06F 12/0864 |
| | | | 711/E12.063 |
| 2006/0129763 A1 | 6/2006 | Royer, Jr. et al. | |
| 2009/0013133 A1* | 1/2009 | Cypher | G06F 9/3004 |
| | | | 711/E12.016 |
| 2012/0066276 A1 | 3/2012 | Deshkar et al. | |
| 2013/0166588 A1 | 6/2013 | Gruschko et al. | |
| 2013/0173853 A1 | 7/2013 | Ungureanu et al. | |
| 2014/0047185 A1 | 2/2014 | Peterson et al. | |
| 2014/0047190 A1 | 2/2014 | Dawkins et al. | |
| 2014/0195739 A1 | 7/2014 | Yu et al. | |
| 2014/0223141 A1* | 8/2014 | Combs | G06F 9/3851 |
| | | | 712/207 |
| 2016/0062791 A1* | 3/2016 | Cain, III | G06F 12/0891 |
| | | | 711/136 |
| 2017/0177895 A1 | 6/2017 | McHale | |
| 2019/0339871 A1 | 11/2019 | Kucherov et al. | |
| 2020/0142830 A1 | 5/2020 | Natanzon et al. | |
| 2020/0201782 A1 | 6/2020 | Tsao et al. | |
| 2020/0264986 A1 | 8/2020 | Eom et al. | |
| 2020/0387455 A1 | 12/2020 | Jakkula et al. | |
| 2021/0117427 A1 | 4/2021 | Xiang | |

OTHER PUBLICATIONS

Zhao et al. "HyCache+: Towards Scalable High-Performance Caching Middleware for Parallel File Systems." May 2014. IEEE. CCGrid 2014. pp. 267-276.*

Gorman, Mel, "Understanding The Linux Virtual Memory Manager," ( https://www.kernel.org/doc/gorman/pdf/understand.pdf), Jul. 9, 2007, pp. 153-166.

Notice of Allowance for U.S. Appl. No. 16/812,257, mailed Jun. 15, 2021.

Notice of Allowance for U.S. Appl. No. 17/504,490, mailed May 3, 2023.

Office Action for U.S. Appl. No. 17/504,490, mailed Jan. 12, 2023.

Shi, Ke, "A Replication and Cache based Distributed Metadata Management System for Data Grid," IEEE, SNPD 2007, Aug. 2007, pp. 20-25.

Zhao, Dongfang et al. "HyCache+: Towards Scalable High-Performance Caching Middleware for Parallel File Systems," May 2014, IEEE, CCGrid 2014, pp. 267-276.

* cited by examiner

EFFICIENT CACHE EVICTION AND INSERTIONS FOR SUSTAINED STEADY STATE PERFORMANCE

CROSS-REFERENCE TO RELATED APPLICATION

This application is a continuation of U.S. patent application Ser. No. 17/504,490, filed on Oct. 18, 2021, which is a continuation of U.S. patent application Ser. No. 16/812,257, filed on Mar. 6, 2020, now U.S. Pat. No. 11,151,050, which claims the priority benefit under 35 U.S.C. § 119(e) of U.S. Provisional patent application Ser. No. 62/957,120, filed on Jan. 3, 2020, the disclosures of which are incorporated herein by reference in their entirety.

TECHNICAL FIELD

The subject matter disclosed herein relates to a distributed system. More specifically, the subject matter disclosed herein relates to a system and a method that efficiently evicts cache entries in a distributed cache of a distributed object store.

BACKGROUND

Distributed object stores utilize sophisticated metadata to manage different aspects of an object, such as a growth or shrinkage of the object, data management policies, object versioning that may be necessitated due to the immutable nature of object store, and a location of the object data in a data store given the object identification (ID), etc. The different managed aspects of an object may cause multiple metadata accesses in the input/output (IO) path before appropriate data may be fetched.

Additionally, due to the nature of metadata of an object store, the access rate of the metadata may be greater than the access rate of the corresponding data of the object. Moreover, the access rate may be further amplified based on the inherent nature of the distributed object store, that is, a single IO operation may translate to several metadata and data operations that are executed in a backend serially or concurrently. Thus, performance of an IO path in an object store may be improved if hotly accessed metadata is in a cache.

Further, due to a multiplier effect involved in frontend-to-backend operations and even though a cache may have a hit rate of 90%, handling of the remaining 10% misses of the cache may have an adverse impact on performance of the frontend IO that is beyond an estimated size of 10% because it is likely that the misses may be part of several different sequences that are required to perform an IO. The slowest operation in such a sequence determines the efficiency for whole sequence. Performance of handling a cache miss may be determined by the efficiency of the cache eviction and insert operations.

Scalable storage solutions may also employ a massive number of threads to achieve performance and the performance of each of the threads may be a bottleneck for the slowest operation. If a thread holds up a contended resource longer caused by the handling of a cache eviction and insertion, the effect may cascade to other threads performing other operations. Such a scenario may work against a requirement for a sustained steady-state performance.

Thus, a challenge for a distributed metadata cache of a distributed object store may be to have eviction and insert operations that may have a minimal to a zero contention with a much more performant lookup operation.

SUMMARY

An example embodiment provides a distributed metadata cache for a distributed object store that may include a plurality of cache entries, an active-cache-entry set, and an unreferenced-cache-entry set. Each cache entry may include information relating to whether at least one IO thread is referencing the cache entry and information relating to whether the cache entry is no longer referenced by at least one IO thread. Each cache entry in the active-cache-entry set may include information that indicates that at least one IO thread is actively referencing the cache entry. Each cache entry in the unreferenced-cache-entry set may be eligible for eviction from the distributed metadata cache by including information that indicates that the cache entry is no longer actively referenced by an IO thread. In one embodiment, each cache entry in the unreferenced-cache-entry set may further include information of a decreasing heat condition of the cache entry, such as a decreased cache hit of the cache entry over time. A cache entry in the unreferenced-cache-entry set may be released to be a free resource based at least one the cache entry being in the unreferenced-cache-entry set for a predetermined period of time, IO characteristics of an application, a rate of consumption of available free resources, and an amount of available free resources falling below a predetermined threshold.

An example embodiment provides a distributed metadata cache for a distributed object store that may include a plurality of cache entries, an active-cache-entry set, an unreferenced-cache-entry set, and a pool of free resources. Each cache entry may include information relating to whether at least one IO thread is actively referencing the cache entry and information relating to whether the cache entry is no longer referenced by at least one IO thread. Each cache entry in the active-cache-entry set may include information that indicates that at least one IO thread is actively referencing the cache entry. Each cache entry in the unreferenced-cache-entry set may be eligible for eviction from the distributed metadata cache by including information that indicates that the cache entry is no longer actively referenced by an IO thread. The pool of free resources may include a resource that is available to become a cache entry in response to an IO thread. In one embodiment, the information that each entry in the active-cache-entry set may include may be a linked list of previous and next pointers. In another embodiment, the information that each entry in the active-cache-entry set includes may be a searchable tree data structure. In one embodiment, each cache entry in the unreferenced-cache-entry set may further include information of a decreasing heat condition of the cache entry, such as a decreased cache hit of the cache entry over time. A cache entry in the unreferenced-cache-entry set may be released to be a free resource based at least one the cache entry being in the unreferenced-cache-entry set for a predetermined period of time, IO characteristics of an application, a rate of consumption of available free resources, and an amount of available free resources falling below a predetermined threshold.

An example embodiment provides a method to manage a distributed metadata cache for a distributed object store that may include: converting a free resource into a first cache entry in response to the distributed metadata cache receiving an input/output (TO) thread; including the first cache entry in a set of active cache entries, each cache entry in the set of active cache entries including information indicating that the cache entry is actively referenced by a one or more corresponding IO threads; including the first cache entry in a set of unreferenced cache entries based on the cache entry no longer being actively referenced by the IO thread, the first cache entry including information indicating that the first cache entry is no longer being actively referenced by the IO thread, and each cache entry in the set of unreferenced cache entries being eligible for eviction from the distributed metadata cache; and evicting the first cache entry from the set of active cache entries and the set of unreferenced cache entries based on one of a predetermined period of time elapsing while the first cache entry is in the set of unreferenced cache entries, based on IO characteristics of an application, and based on an amount of available free resources falling below a predetermined threshold. Evicting the first cache entry from the set of active cache entries and the set of unreferenced cache entries may include releasing the first cache entry into a pool of free resources.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
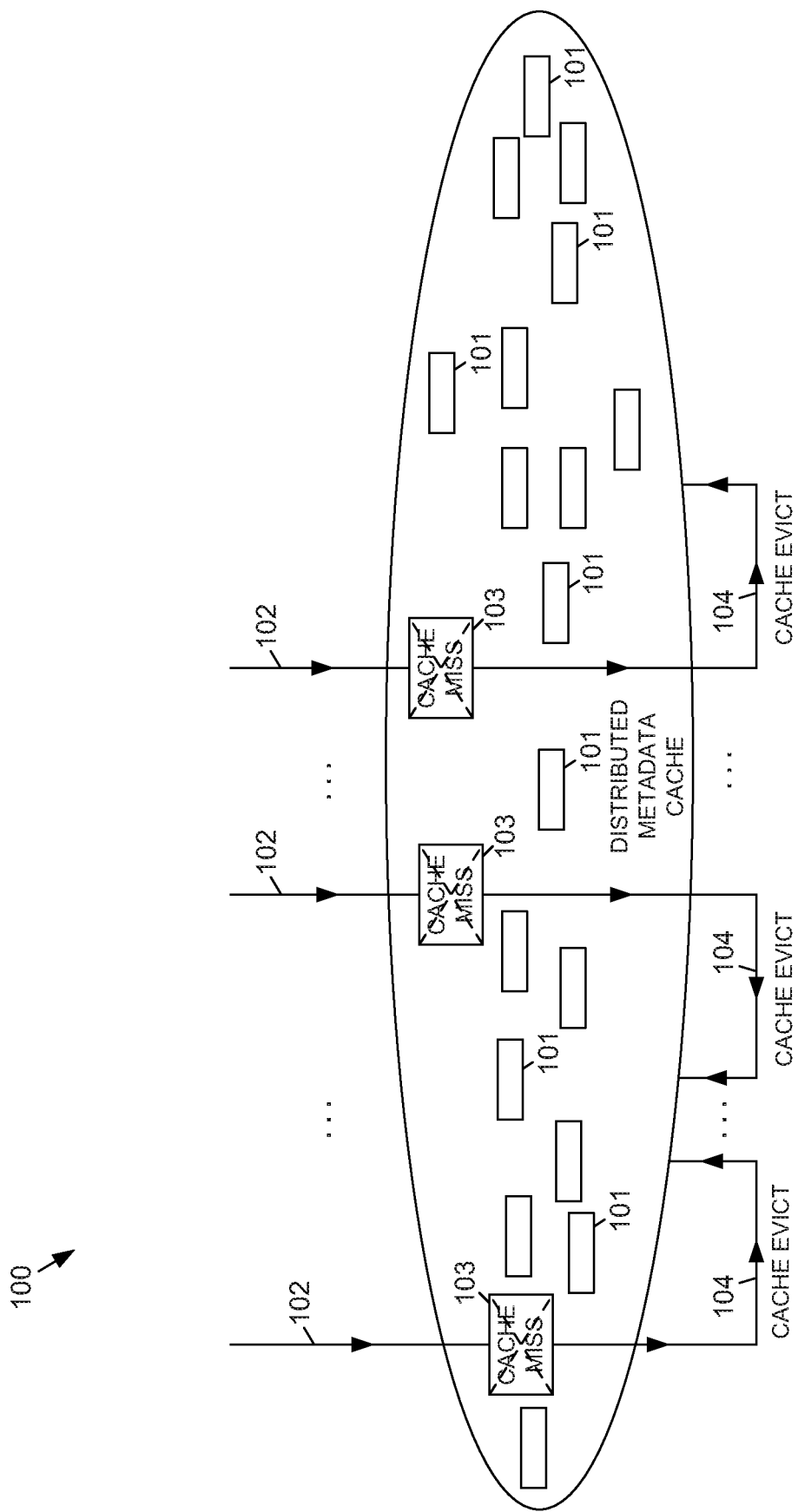
FIG. 1 pictorially depicts a cache-insertion operation for a traditional cache management solution for a distributed cache during a steady state of a distributed object store.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The software may be embodied as a software package, code and/or instruction set or instructions, and the term "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC) and so forth. The various components and/or functional blocks disclosed herein may be embodied as modules that may include software, firmware and/or hardware that provide functionality described herein in connection with the various components and/or functional blocks.

FIG. 1 pictorially depicts a cache-insertion operation for a traditional cache management solution for a distributed cache during a steady state of a distributed object store. Entries 101 for metadata objects are cached in a distributed metadata cache 100. As a cache lookup 102 comes into the cache 100 in the context of an IO operation, in some cases the result may be a cache miss 103. To create a free resource during the steady state of the distributed object store, a traditional cache-insertion operation almost always results in a cache-eviction operation 104. Once the free resource has been created by a cache-eviction operation, a new entry 101 is inserted (not shown) into the cache 100.

A traditional cache-eviction operation may include finding the most suitable entry 101 in the entirety of a distributed cache 100 for eviction. The basis on which "suitableness" of an entry is determined may be critical to avoid evicting a hot entry that, if evicted, may result in additional cache misses that can subsequently trigger more cache insertion operations. Once a suitable entry 101 for eviction has been found, a cluster-wide operation may be performed to relinquish ownership of the entry that is to be evicted. So, the efficiency of the IO thread may be tied directly to the efficiency of a cache-eviction operation. A traditional cache-eviction operation may result in unpredictable contentions for a scalable object store that employs an enormous number of threads for performance. This may cause unpredictability and loss of sustained performance in a scalable multi-threaded object store.

According to the subject matter disclosed herein, a key to an efficient eviction process may be to always find suitable entries that may be evicted without requiring a search like that associated with a traditional cache-eviction operation, that is, without requiring a search of the entire distributed cache. Another key may be for such a cache-eviction process to have zero contention with a performant cache-lookup operation, and a minimal contention with a cache-insertion operation.

The subject matter disclosed herein also provides a cache-eviction mechanism in which an independent set of cache entries is maintained that are eligible for eviction. Such a set may be referred to herein as an "unreferenced set." The eviction process disclosed herein efficiently moves a cache entry into and out of the unreferenced set in a way that does not impact ongoing lookup operations in the cache.

As a scalable distributed object-storage system reaches a steady state, the system is likely to have an enormous number of objects in an active working set. A distributed cache used for handling IOs at steady state may involve dealing with a large working set. The efficiency of the cache-eviction and cache-insertion operations may have an impact on the steady performance of the system at steady state. The subject matter disclosed herein manages the distributed cache so that existing entries may be efficiently evicted to free up resources for new entries that are to be inserted into the cache.

Additionally, the subject matter disclosed herein provides a distributed metadata cache of a distributed object store that achieves sustained steady-state performance by decoupling cache-eviction operations from cache-insertion operations. Cache-eviction operations are made efficient by decoupling eviction operations from the size of the current working set, that is, by not having to search the entire working set to find suitable entries that can be evicted. Accordingly, contentions are reduced between cache-lookup operations and ongoing cache evictions.

Further, cache-insertion operations may be made efficient by increasing the probability that a free resource is available, thereby making the likelihood greater that a new entry may be inserted into the cache. An independent cache-eviction mechanism self-tunes and self-triggers, thereby making the most likely occurring cache-insertion operation a one step process. The most likely occurring cache-insertion operation may be finding a free resource and using the free source to insert a new entry into the cache. A less likely occurring case may be a cache-insertion operation informing the cache-eviction mechanism of a need for a free resource and then waiting for the resource to be made available for a cache-insertion operation. The cache-eviction mechanism responds aggressively to such requests to ensure that the cache-insertion operation may proceed as rapidly as possible. Moreover, cache evictions are made sensitive to the current pressure on a free resource pool, and the cache-eviction mechanism may also auto tune aggressiveness based on resource needs. Thus, the subject matter disclosed herein may help in steady state IO performance of a distributed cache of a distributed object store.

The separation of the eviction process from the insertion process allows the eviction mechanism to scale efficiently and independently of the size of the cache working set. The efficiency of the eviction mechanism may be provided by the following factors. The work needed to be done in connection with an eviction is not dependent upon the size of the current working set in the cache, which may potentially be large. The synchronization of the working set is independent of the synchronization of the eviction process, thereby helping make the cache-eviction process have no contentions with a cache-lookup operation. This also minimizes contention between the cache-insertion and cache-eviction operations because the cache-insertion operation only synchronizes on an active set of cache entries. The cache-eviction process does not require synchronization on the active set, except when the cache eviction releases a cold entry.

The cost of the cache-eviction operation may be removed from the context of an IO operation. Further, the cache-eviction threads may fine tune finding a suitable cache entry for eviction and rate of eviction based on the resource usage without impacting the performance of the IO path. The criteria for finding a suitable entry may be extended to include information from a mechanism external to the metadata cache. The external mechanism may, for example, be a user-driven configuration option or an analytical tool that runs over historical data to dynamically tune the eviction criteria for eviction or other such mechanisms.

Figure 2:
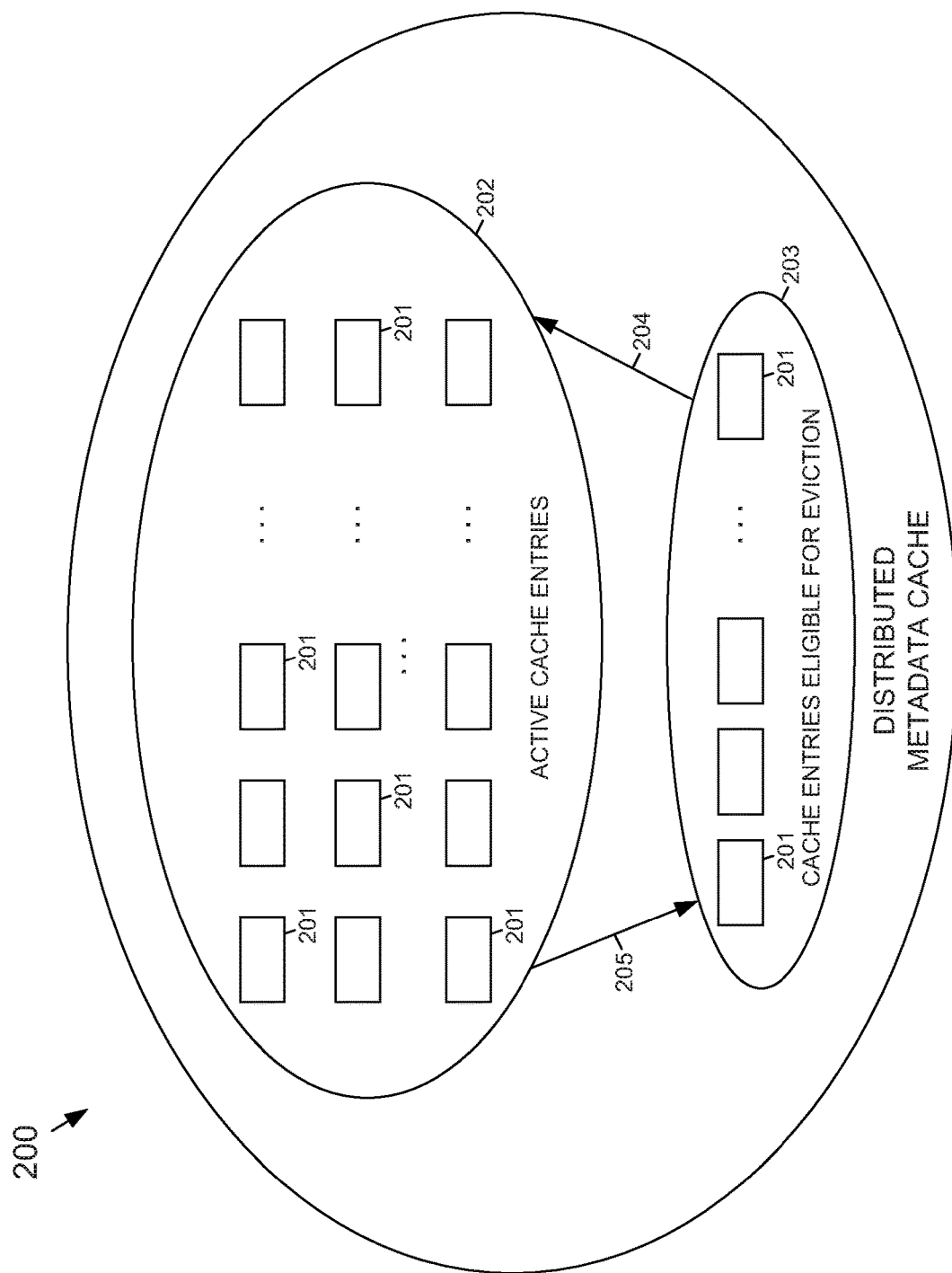
FIG. 2 depicts a logical view of an example embodiment of a distributed metadata cache of a distributed object store according to the subject matter disclosed herein.

FIG. 2 depicts a logical view of an example embodiment of a distributed metadata cache 200 of a distributed object store according to the subject matter disclosed herein. The metadata cache 200 may include a plurality of cache entries 201, of which only a few cache entries 201 are indicated. The physical location of where the metadata cache 200 is placed with respect to the distributed object store may vary depending upon the architecture of the distributed system and the distributed object store. The technique disclosed herein is applicable regardless where a metadata cache is located within a distributed system.

Each cache entry 201 may be part of two cache-entry sets—an active set 202 and an unreferenced set 203. The active set 202 may include cache entries that are actively referenced by IO threads. The unreferenced set 203 may include cache entries that are eligible for eviction. A cache entry 201 may include attributes of both sets. Each set uses a synchronizing process (for adding or removing cache entries) that is independent of the synchronizing process other set. The synchronizing process for the unreferenced set 203 may be a background process. In one embodiment, the synchronizing process may use a lock, a mutual exclusion object (mutex) and/or some other software synchronization mechanism. The component or components of the distributed that manage the synchronization process will vary depending upon the specific architecture of the distributed system. The synchronization technique disclosed herein is independent of the kind of metadata that the distribute system uses.

Figure 3:
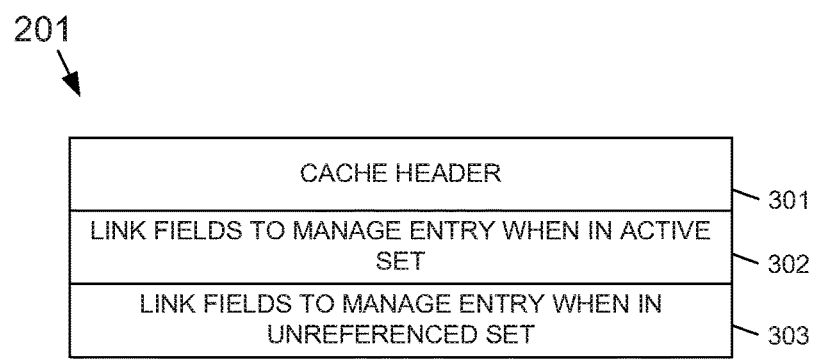
FIG. 3 depicts an example configuration of a cache entry in a distributed metadata cache according to the subject matter disclosed herein.

FIG. 3 depicts an example configuration of a cache entry 201 in the distributed metadata cache 200 according to the subject matter disclosed herein. The cache entry 201 includes a cache header 301, an active links field 302, and an unreferenced links field 303. The cache header 301 may include information for uniquely identifying the cache entry. The active links field 302 may include information and links to one or more IO threads that are actively referencing the cache entry. The unreferenced links field 303 may include information and links to one or more IO threads that are no longer actively referencing the cache entry. The links in the active links field 302 and the links in the unreferenced links field 303 may be dependent upon the specific data structure selected to manage the respective sets. For example, if the active set is a doubly linked list, then the active links will include previous and next pointers. If, however, the active list is a searchable-tree data structure, then the active list field will include data that is appropriate for the searchable-tree data structure. Similarly, the unreferenced links field 302 will have previous and next pointers if a doubly linked list data structure is used, and will have data that is appropriate for the searchable-tree data structure.

Figure 4:
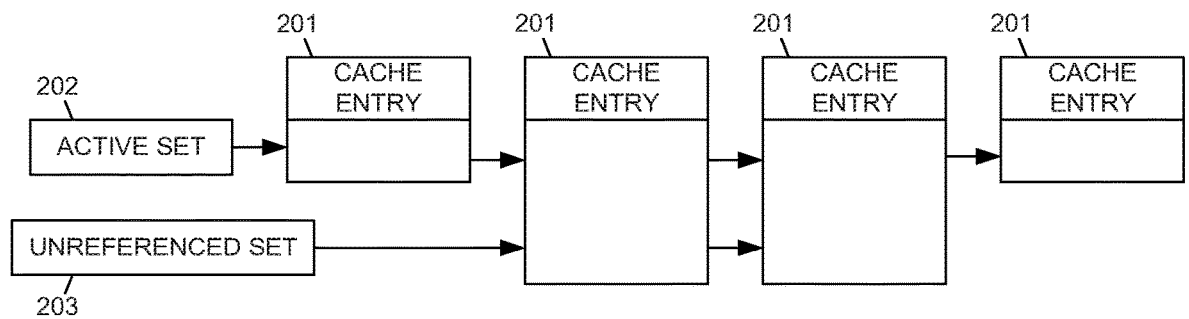
FIG. 4 depicts an example sequence of a cache entry as a member of the active set of cache entries and as a member of the unreferenced set of cache entries according to the subject matter disclosed herein.

FIG. 4 depicts an active set and an unreferenced set are managed in the case in which the data structure that has been selected is a doubly linked list according to the subject matter disclosed herein. The cache entries 201a and 201d are in the active set 202, but not in the unreferenced set 203. The arrows that extend from the active set 202 and the unreferenced set 203 represent respectively represent an inclusion of a cache entry 201 in the active set 202 and/or the unreferenced set 203. In this case, the entries 201a and 201d are hot entries with active ongoing usage. Cache entries 201b and 201c are part of the active set 202 and the unreferenced set 203, and are not actively being used at the time depicted in FIG. 4. Even though they are not actively being used, the cache entries 201b and 201c are available in the metadata cache.

If a cache entry 201 in the unreferenced set 203 is freshly referenced again by a new IO thread, the IO thread that newly referenced the cache entry 201 may only mark the entry as active and the cache entry may be left in the unreferenced set 203. A cache entry 201 is always referenced as part of cache-lookup operation in order to ensure that the IO thread performing the reference does not have a contention with the eviction mechanism.

The cache maintains a reference counter that is based on the number of threads that are actively referencing a cache entry. When the last IO thread completes its usage of a cache entry, the cache detects that there is no more active ongoing usage of the entry. When the IO thread completes its usage of one or more cache entries, the IO thread releases the cache entries that it acquired at the beginning of the IO thread.

An independent set of eviction threads process the unreferenced set 203. If entry is found to be actively referenced, the entry is removed from the unreferenced set (204 in FIG. 2). This removal does not require the eviction thread to synchronize on the active set because each entry in the unreferenced set may also be part of the active set. The eviction process continues to next entry in the unreferenced set. As time passes, the heat accumulated on the cache entry decays. The mechanism as to how the heat of a cache entry is managed, i.e., increased or decreased, is managed by the metadata cache and is independent of the cache-eviction technique disclosed herein.

If entry has gone cold, then the eviction process waits a predetermined period of time before releasing the resource used by the cache entry into a free pool. The predetermined period of time period may help minimize an impact on ongoing cache-lookup operations, and thus may help steady-state performance of the distributed cache. In one embodiment, the predetermined period of time may be based on the IO characteristics of an application using cache entries in the cache. In one embodiment, tuning of the predetermined period of time may be done via a management console for the distributed system.

The cache-eviction technique disclosed herein may dynamically and/or automatically tune the eviction criteria based on one or both of the following factors. The number of free resources that are available may be monitored and as the number of free resources decreases and/or falls below a predetermined threshold, the aggressiveness of the cache-eviction technique may be increased. The rate of consumption of the free resources may be monitored and if the rate indicates that the available free resources may not be sufficient, the aggressiveness of the cache-eviction technique may be increased accordingly.

Figure 5:
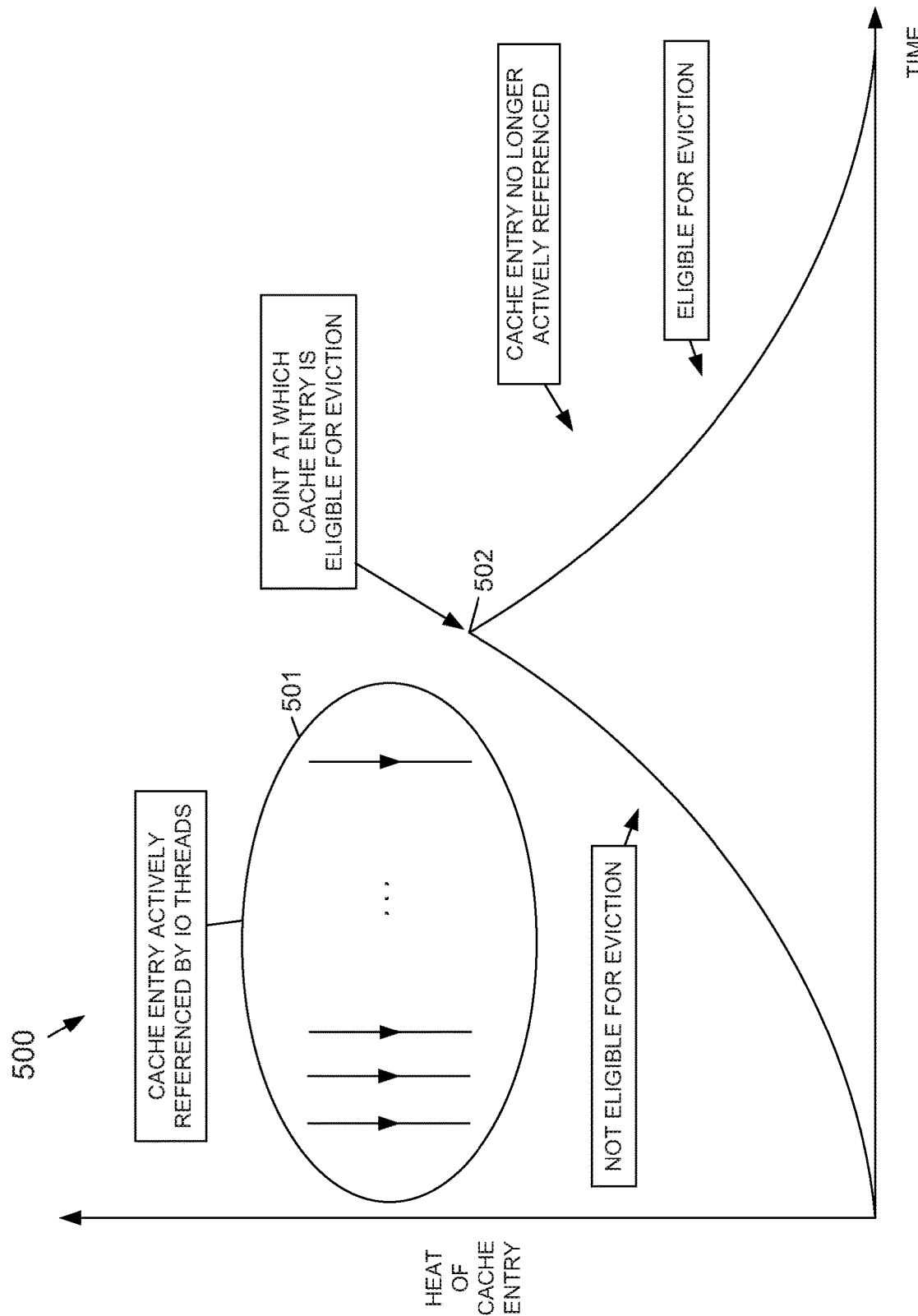
FIG. 5 depicts a graph of an example lifetime of an entry in a cache according to the subject matter disclosed herein.

FIG. 5 depicts a graph of an example lifetime 500 of an entry in a cache according to the subject matter disclosed herein. The abscissa of FIG. 5 is time, which increases toward the right, and the ordinate of FIG. 5 is the heat of the cache entry, which increases in the upward, or positive, direction. The lifetime 500 of a cache entry begins at the origin of the graph of FIG. 5 when the cache entry is inserted into the distributed cache. As time increases, the heat of the cache entry increases because the cache entry is increasingly actively referenced by IO threads 501. At 502, as the active referencing of the cache entry begins to decrease, the heat of the cache entry also decreases. At 502, the point when the active referencing of the cache entry begins to decrease, the cache entry becomes eligible for eviction. As time passes and the active referencing of the cache entry continues to decrease, the eligibility for the cache entry for eviction increases. There may be instances in which the heat of the cache entry begins to increase, and the eligibility for eviction correspondingly decreases. In one embodiment, as the heat of a cache entry begins to increase after decreasing, the eligibility for eviction is reduced to zero until the active referencing of the cache entry again begins to decrease, much like the inflection point at 502. There may also be instances in which the lifetime of a cache entry repeatedly changes from ineligibility to eligibility before finally being evicted from the cache. The cache entry lifetime 500 depicted in FIG. 5 is only an example, and may include a portion in which the heat levels off, or plateaus, before decreasing.

Figure 6:
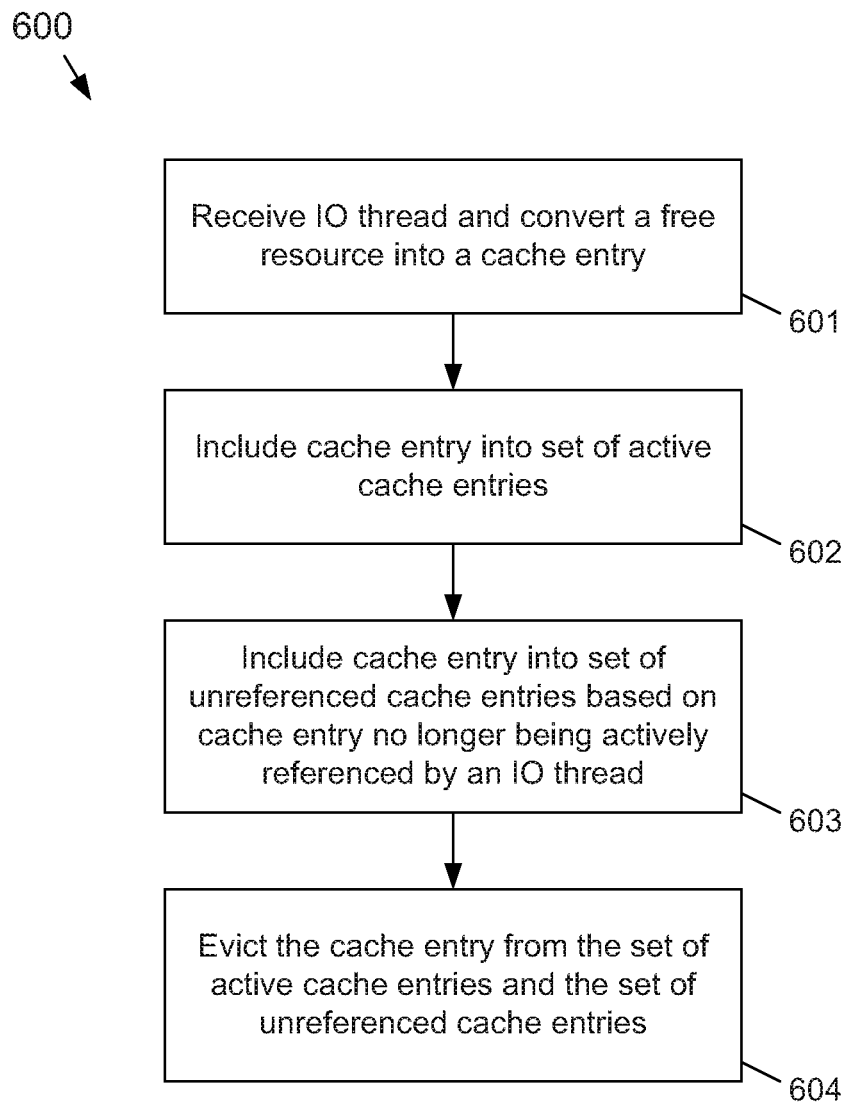
FIG. 6 is a flow diagram for a method of managing distributed metadata cache for a distributed object store according to the subject matter disclosed herein.

FIG. 6 is a flow diagram for a method 600 of managing distributed metadata cache for a distributed object store according to the subject matter disclosed herein. At 601, an IO thread is received by the distributed cache and, in response, a free resource is converted into a cache entry. At 602, the cache entry is included in a set of active cache entries in which each cache entry in the set includes information indicating that the cache entry is actively referenced by one or more IO threads. At 603, if the cache entry is no longer being actively referenced by an IO thread, the cache entry is included in a set of unreferenced cache entries, and the cache entry is eligible for eviction. Each entry in the set of unreferenced cache entries includes information indicating that the cache entry is no longer being actively referenced by an IO thread. In one embodiment, the cache entry may be included in the unreferenced cache entry set based on a decrease in the heat of the cache entry, i.e., a decrease in hits of the cache entry over time. If, for example, the heat of the cache entry begins to increase, the cache entry may be removed from the unreferenced cache entry set, but remain the active cache entry set. At 604, the cache entry is evicted from both the active cache entry set and the unreferenced cache entry set. The eviction of the cache entry may be based on one or more of a predetermined period of time elapsing while the first cache entry is in the set of unreferenced cache entries, based on IO characteristics of an application, based on an amount of available free resources falling below a predetermined threshold, and based on a rate of consumption of available free resources. The evicted cache entry may be returned to a pool of free resources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions recited in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A distributed metadata cache comprising:
a cache entry including a cache header, a first link to a first input/output (I/O) thread that references the cache entry, and a second link to a second I/O thread that is in a different referencing state than the first I/O thread,
wherein the cache header contains an identifier, and
wherein the different reference state indicates a decrease in hits of the cache entry.

2. The distributed metadata cache of claim 1, wherein the first link to the first I/O thread is part of a set in a doubly linked list.

3. The distributed metadata cache of claim 2, wherein the links in the set include previous and next pointers.

4. The distributed metadata cache of claim 1, wherein the second link to the second I/O thread is part of a set in a doubly linked list.

5. The distributed metadata cache of claim 1, wherein the first link to the first I/O thread is part of a set in a searchable-tree data structure.

6. The distributed metadata cache of claim 1, wherein the distributed metadata cache maintains a reference counter accounting for a number of I/O threads that reference the cache entry.

7. The distributed metadata cache of claim 6, wherein the I/O threads each release their respective cache entry.

8. The distributed metadata cache of claim 7, wherein a determination that the cache entry is eligible for eviction is based on I/O characteristics of an application using the cache entry.

9. The distributed metadata cache of claim 8, wherein a determination that the cache entry is eligible for eviction is based on a rate of consumption of free resources by the application.

10. A method of managing a distributed metadata cache comprising:

assigning to a cache entry a cache header, a first link to a first input/output (I/O) thread that references the cache entry, and a second link to a second I/O thread that is in a different referencing state than the first I/O thread, wherein the cache header contains an identifier, and wherein the different reference state indicates a decrease in hits of the cache entry.

11. The method of managing a distributed metadata cache of claim 10, wherein the first link to the first I/O thread is part of a set in a doubly linked list.

12. The method of managing a distributed metadata cache of claim 11, wherein the links in the set include previous and next pointers.

13. The method of managing a distributed metadata cache of claim 10, wherein the second link to the second I/O thread is part of a set in a doubly linked list.

14. The method of managing a distributed metadata cache of claim 10, wherein the first link to the first I/O thread is part of a set in a searchable-tree data structure.

15. The method of managing a distributed metadata cache of claim 10 further comprising:

maintaining a reference counter accounting for a number of I/O threads that reference the cache entry.

16. The method of managing a distributed metadata cache of claim 15, wherein the I/O threads each release their respective cache entry.

17. The method of managing a distributed metadata cache of claim 16 further comprising:

determining that the cache entry is eligible for eviction based on I/O characteristics of an application using the cache entry.

18. The method of managing a distributed metadata cache of claim 17, wherein the determining that the cache entry is eligible for eviction is based on a rate of consumption of free resources by the application.

\* \* \* \* \*